US010963963B2

(12) United States Patent
Lynch et al.

(10) Patent No.: US 10,963,963 B2
(45) Date of Patent: Mar. 30, 2021

(54) RULE BASED HIERARCHICAL CONFIGURATION

(71) Applicant: InvestCloud Inc, Beverly Hills, CA (US)

(72) Inventors: Robert Lynch, Ancaster (CA); Reginald Tang, Burlington (CA); John W. Wise, West Hollywood, CA (US); Vicent Sos-Munoz, Beverly Hills, CA (US)

(73) Assignee: InvestCloud Inc, West Hollywood, CA (US)

( * ) Notice: Subject to any disclaimer, the term of this patent is extended or adjusted under 35 U.S.C. 154(b) by 357 days.

(21) Appl. No.: 15/083,091

(22) Filed: Mar. 28, 2016

(65) Prior Publication Data

US 2017/0278193 A1 Sep. 28, 2017

(51) Int. Cl.
*G06Q 40/06* (2012.01)

(52) U.S. Cl.
CPC .................... *G06Q 40/06* (2013.01)

(58) Field of Classification Search
CPC ........................................ G06Q 40/06
USPC ....................................... 705/36 R
See application file for complete search history.

(56) References Cited

U.S. PATENT DOCUMENTS

| 5,523,942 | A * | 6/1996 | Tyler | G06Q 30/04 705/34 |
| 7,669,147 | B1 * | 2/2010 | Molander | G06F 3/0482 715/854 |
| 8,650,050 | B1 * | 2/2014 | Lee | G06Q 10/10 705/4 |
| 9,047,277 | B2 * | 6/2015 | Mogilicherla | G06F 16/273 |
| 9,471,664 | B2 * | 10/2016 | Riggs | G06F 16/245 |
| 10,372,807 | B1 * | 8/2019 | Greenbaum | G06F 40/177 |
| 2005/0039003 | A1 * | 2/2005 | Wray | G06F 21/57 713/166 |
| 2005/0065964 | A1 * | 3/2005 | Ziemann | G06F 16/2246 |
| 2009/0299915 | A1 * | 12/2009 | Reiss | G06Q 40/06 705/36 R |
| 2010/0179861 | A1 * | 7/2010 | Teerilahti | G06Q 30/0278 705/7.33 |
| 2011/0060732 | A1 * | 3/2011 | Bonneau | G06Q 30/0609 707/722 |
| 2015/0242453 | A1 * | 8/2015 | Kumano | G06F 16/282 707/742 |

(Continued)

OTHER PUBLICATIONS

Paul E. Black, "data structure", Dec. 15, 2004, Dictionary of Algorithms and Data Structures [online], Paul E. Black, ed.(accessed May 19, 2020) Available from: https://www.nist.gov/dads/HTML/dataStructure.html.*

(Continued)

*Primary Examiner* — Christopher Bridges
*Assistant Examiner* — Yongsik Park
(74) *Attorney, Agent, or Firm* — Patent Ingenuity, P.C.; Samuel K. Simpson (57) ABSTRACT

A system comprises a rules engine that generates a hierarchical structure based upon investment data and a plurality of rules. Further, the system comprises a processing engine that performs one or more calculations on data stored by the hierarchical structured based upon the rules and generates a report based upon the one or more calculations.

6 Claims, 9 Drawing Sheets

(56) References Cited

U.S. PATENT DOCUMENTS

| | | | |
|---|---|---|---|
| 2015/0324919 A1* | 11/2015 | Riggs ................ | G06F 16/22 705/36 R |
| 2016/0132968 A1* | 5/2016 | Ayal ................. | G06Q 40/06 705/36 R |

OTHER PUBLICATIONS

Title: Patterns of trading profiles at the Nordic Stock Exchange. A correlation-based approach. Authors: Federico Musciotto, Luca Marotta, Salvatore Micciche, Jyrki Piilo, Rosario N. Mantegna (Year: 2015).*

* cited by examiner

RULE BASED HIERARCHICAL CONFIGURATION

BACKGROUND

1. Field

This disclosure generally relates to the field of computing devices. More particularly, the disclosure relates to hierarchical structures utilized by computing devices for data aggregation.

2. General Background

Organizations may utilize a variety of portfolio managers that are not part of such organizations to manage their investments rather than utilizing employees. Examples of such organizations may include universities, pension funds, etc. By utilizing such portfolio managers, the organizations may have employees concentrate on activities of the organization rather than investment decisions that are a specialty of portfolio managers.

An organization may be responsible for investing a significant cash sum for which the organization diversifies risk allocation through a variety of different portfolio managers. Thus, the organization tries to reduce the risk of investment decisions from any one portfolio managers. As a result, the organization typically monitors the investment decisions of the different portfolio managers and changes allocations of the total investment amount to members of that group of portfolio managers as necessary so that adequate performance standards are met.

To ensure that the portfolio managers are obtaining adequate results, the organization will typically require that the portfolio managers report various metrics, e.g., performance and market value, on a regular basis. The organization may then utilize such reporting to change investment allocations, i.e., increasing the allocations to the better performing portfolio managers and decreasing the allocations to the lesser performing portfolio managers.

Current configurations allow portfolio managers to organize the results that are reported in a nested manner. For example, portfolio managers may utilize current configurations to organize data according to a first level of asset class, a second level of strategies, and a third level of investment. The formula for performing such aggregation may utilize certain events, e.g., cash flow, and the timing of those events for all investments that are nested under the same heading. Therefore, current configurations allow for hierarchical aggregation of investment data for reporting purposes. In addition, the hierarchical aggregation allows portfolio managers to view such data in a user interface.

Most current hierarchical configurations are static tree implementations. In other words, the nested investment data is presented in a rigid structure. Such configurations often have limited nesting depth, i.e., may typically only include between three to five levels of nesting. Further, the breadth of such configurations is often predetermined by the first level of a known taxonomy. In addition, each nesting level must represent the same concept, e.g., all aggregations at a third nesting level must be of a type of investment strategy. Such a predictable structure has allowed for automated configurations to place investment allocations into the corresponding location of the static tree, but has prevented portfolio managers from placing allocations into tree locations that are intuitive.

To mitigate the rigidity of the static tree implementations, some configurations allow for freeform development of tree structures with arbitrary nesting, breadth, and depth. Yet, the arbitrary structure of such free form configurations prevents automation. Therefore, the freeform tree implementations require manual placement of investments in corresponding nesting levels of a freeform tree. Further, the freeform tree must be maintained indefinitely during the evolution of the portfolio.

As a result, the current configurations are either too rigid for portfolio managers to customize to provide effective reporting or too manual for efficient allocations of significant quantities of investments in a tree structure. Therefore, current hierarchical configurations do not provide effective hierarchical aggregation of investment data for reporting purposes.

SUMMARY

In one aspect of the disclosure, a system is provided. The system comprises a rules engine that generates a hierarchical structure based upon investment data and a plurality of rules. Further, the system comprises a processing engine that performs one or more calculations on data stored by the hierarchical structured based upon the rules and generates a report based upon the one or more calculations.

In another aspect of the disclosure, a computer program product is provided. The computer program product comprises a computer useable storage device having a computer readable program. The computer readable program when executed on a computer causes the computer to generate, with a rules engine, a hierarchical structure based upon investment data and a plurality of rules. Further, the computer is caused to perform, with a processing engine, one or more calculations on data stored by the hierarchical structured based upon the rules and generates a report based upon the one or more calculations.

In yet another aspect of the disclosure, a process is provided. The process generates, with a rules engine, a hierarchical structure based upon investment data and a plurality of rules. Further, the process performs, with a processing engine, one or more calculations on data stored by the hierarchical structured based upon the rules and generates a report based upon the one or more calculations.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A rule based hierarchical configuration may be utilized to provide automated generation of a hierarchical structure for aggregated data according to one or more rules. The rule based hierarchical configuration utilizes and automated approach that allows for arbitrary nesting, breadth, and depth. Further, the rule based hierarchical configuration utilizes a rules engine to translate the one or more rules authored by a user into a consistent and predictable hierarchical structure, e.g., tree. Therefore, the rule based hierarchical configuration improves the functionality of a computer by automatically generating a hierarchical structure based upon a plurality of rules. Terminology that is utilized to describe the rule based hierarchical configuration is defined.

An entity is an individual investment vehicle of any asset type. A market value is associated with an entity.

A consolidation is a container, i.e., a data structure that organizes data according to certain access rules. The consolidation is utilized to aggregate various metrics, e.g., performance, market value, etc., of an arbitrary or rule driven set of entities. The rule based hierarchical configuration comprises one or more nested consolidations.

A hierarchical structure scope is the set of all entities for consolidation, aggregation, and reporting to an organization. As an example, the hierarchical structure scope may be particular asset classes. The investments belonging to those asset classes are then automatically part of the hierarchical structure scope.

An assignment is the immediate parent consolidation for an entity. In other words, the assignment is the consolidation to which the consolidation belongs that is one level higher than the entity.

A split assignment is an expression of multiple immediate parent consolidations for an entity during different time periods. For example, an entity may be assigned to a bonds consolidation and a planned redemptions consolidation if the entity is assigned to the different consolidations during different contribution periods of time.

An allocation is the percentage of an entity's market value that is deemed to be a contribution to any aggregated metric of the entity's parent consolidation. The allocation allows the portfolio manager to report a particular percentage of a contribution based upon the hierarchical structure.

A split allocation is a split assignment that is expressed through allocation percentages. For example, a split allocation may express a sixty percent allocation to an assignment of domestic equities and a forty percent allocation to an assignment of foreign equities.

A contribution period is a span of time, i.e., a start data and an optional end date, for which an entity contributes to the aggregated market value and/or other metrics of a consolidation. Contribution periods may be discontinuous for any assignment.

The rule based hierarchical configuration has certain properties. An operation performed in the rule based hierarchical configuration automatically recomputes entity allocations and contributions to ensure that the rule based hierarchical configuration is constantly in a valid state. Further, the rule based hierarchical configuration auto-updates the hierarchical structure based on external systems events, e.g., a new entity being added, new cash flow being added, etc. Therefore, the hierarchical structure generated by the rule based hierarchical configuration automatically reflects changes based on data received by the rule based hierarchical configuration.

In addition, the rule based hierarchical configuration allows for generation of complex hierarchical structures having many layers of consolidation, allocation splits, and transfers over time. In contrast with previous static tree based configurations that were limited to three to five levels of nesting depth, the rule based hierarchical configuration allows a user to generate a rule based hierarchical configuration having a depth of many more levels based upon the customization of the user.

The rule based hierarchical configuration also allows for utilization of an aspect hierarchical structure, which is a subtype of a hierarchical structure. The aspect hierarchical structure is an approach that is utilized to tag multiple entities with multiple facet values in an efficient manner.

Further, aspect hierarchical structures may be imported into other hierarchical structures for generation of a variety of different reports. The generated reports stay in synch with the original hierarchical structure and are dynamically updated based on system events. In contrast, previous tree based configurations do not allow for reports to stay in synch with a tree and be dynamically updated.

In addition, the rule based hierarchical configuration allows for generation of static hierarchical structures by associating certain entities to a specific consolidation. As a result, an override of the rules of that consolidation is performed.

The rule based hierarchical configuration also provides a variety of features that reduce manual operations that were required by previous tree based configurations. For example, the rule based hierarchical configuration automatically computes consolidation start and/or end dates based on entity changes. Further, the rule based hierarchical configuration allows for automatic calculation of allocations based on ratios when utilizing aspect hierarchical structures.

The rules in the rule based hierarchical configuration are inherited by particular levels in the hierarchical structure. Further, the rules in the rule based hierarchical configuration limit the scope of the rule based hierarchical configuration and define entity consolidation behavior.

Further, one or more benchmarks may be utilized at any level of the hierarchical structure. For example, such benchmarks may be compared with associated benchmarks at different levels of the hierarchical structure.

Figure 1:
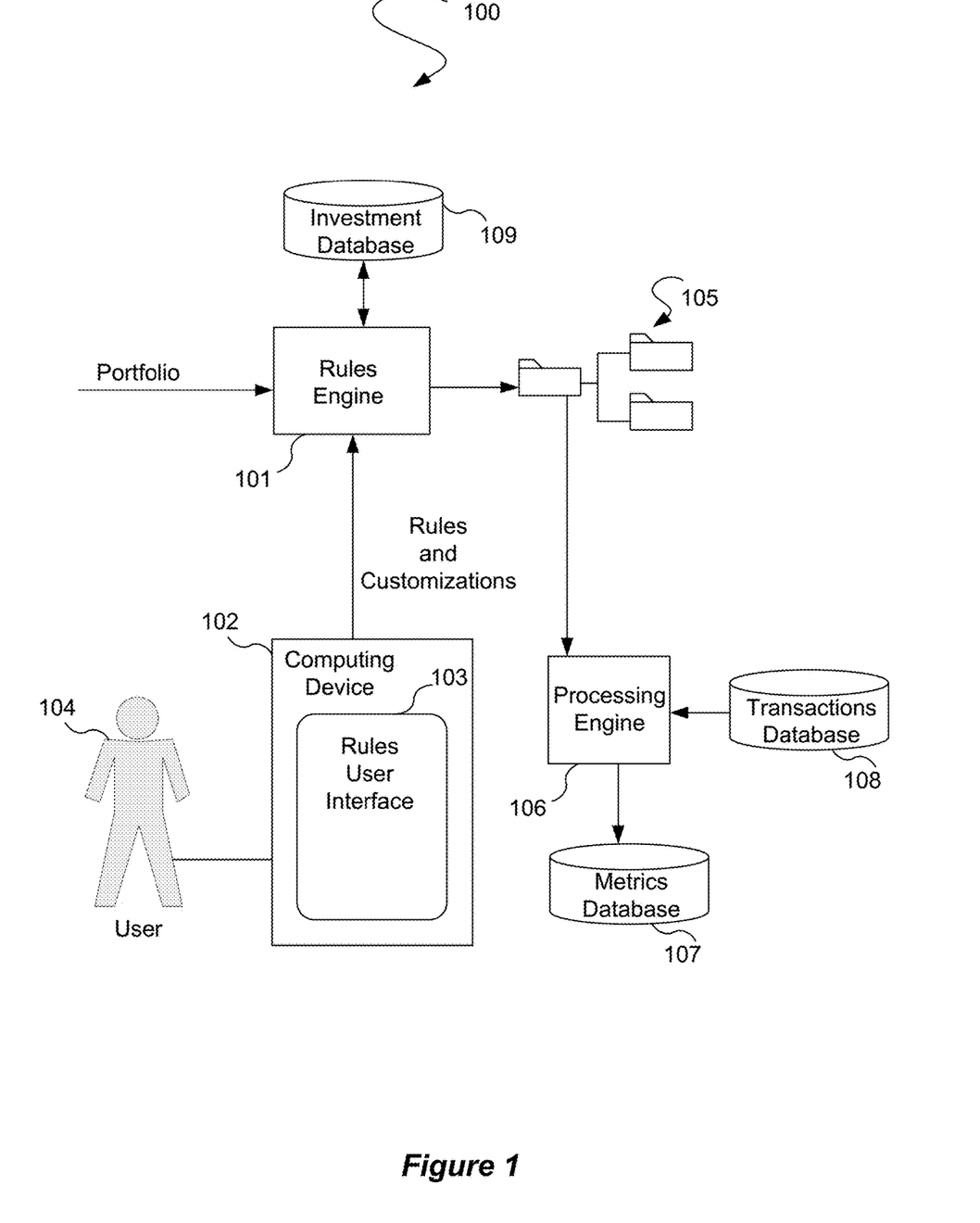
FIG. 1 illustrates a rule based hierarchical configuration.

FIG. 1 illustrates a rule based hierarchical configuration 100. The rule based hierarchical configuration 100 includes a rules engine 101 that generates a hierarchical structure 105 based upon one or more rules and/or customizations provided by a user 104 through a computing device 102 for a portfolio of investments that are received by the rules engine 101. The computing device 102 may be a smartphone, tablet device, smartwatch, laptop computer, personal computer ("PC"), etc. The user 104 may prepare and/or submit rules to the rules engine 101 through a rules user interface 103 that is displayed by the computing device 102.

The rules engine 101 only has to import the portfolio in a single instance. The rules engine 101 may then receive continuous portfolio updates to that portfolio. Further, the rules engine 101 sends the hierarchical structure 105 to the processing engine 106 to perform on demand calculations.

The rules engine 101 goes through two phases based upon each action taken by a user or an external event. The phases are the sync scope phase and the sync hierarchical structure phase.

Figure 4:
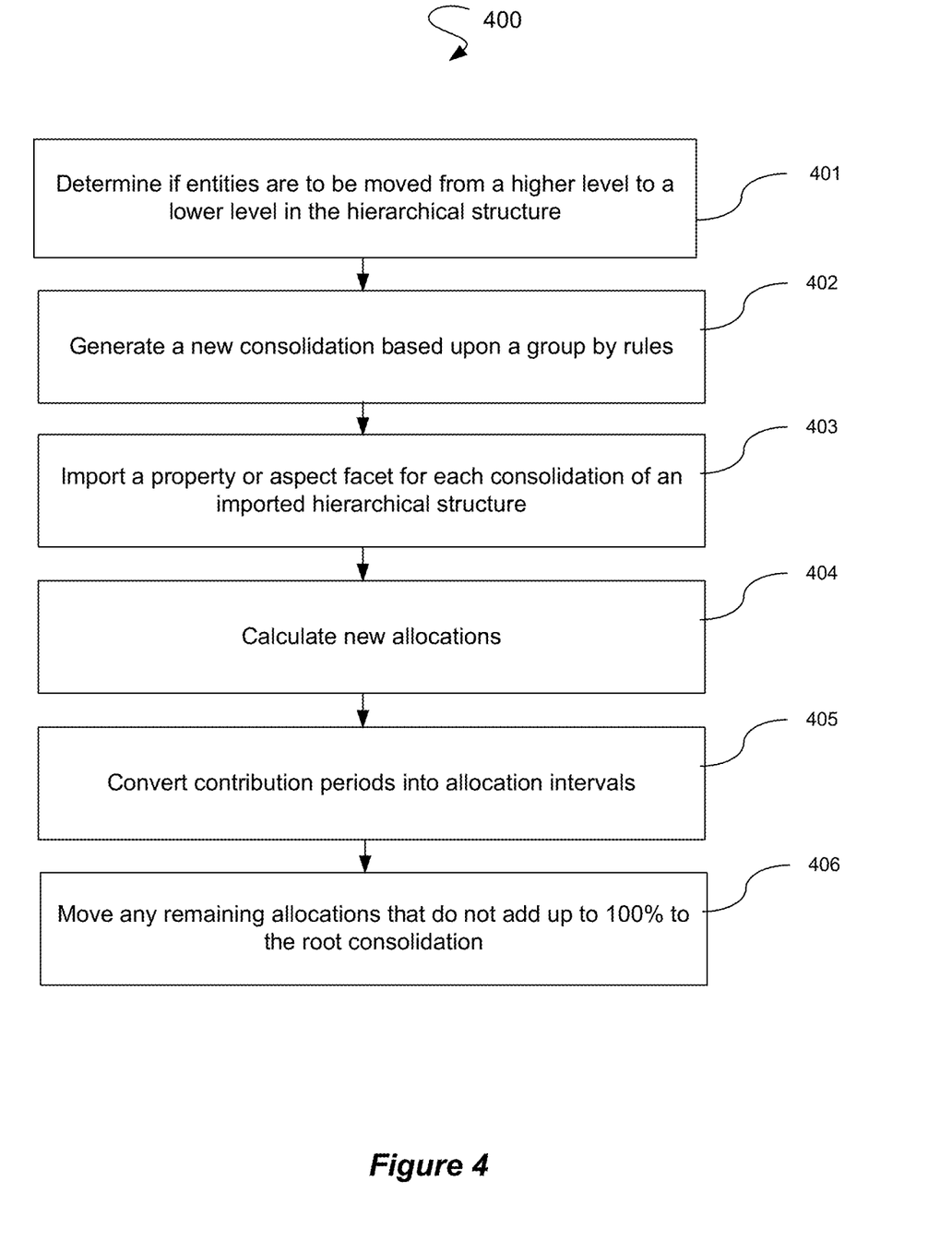
FIG. 4 illustrates a process that performs the sync hierarchical structure phase.

The sync scope phase adds new entities to the scope of the hierarchical structure 105 and removes the entities that do not match the scope as determined by whether or not the root consolidation level rules match an index as determined by the rules engine 101. The sync hierarchical structure phase is performed by a process 400 as illustrated by FIG. 4.

At a process block 401, the process 400 determines if entities are to be moved from a higher level to a lower level in the hierarchical structure 105. The rules associated with the hierarchical structure 105 are analyzed for such a determination. Further, at a process block 402, the process 400 generates a new consolidation based upon a group by rules. In addition, at a process block 403, the process 400 imports a property or aspect facet for each consolidation of an imported hierarchical structure. At a process block 404, the process 400 calculates new allocations. Such calculations are performed after the generation of the hierarchical structure 105 and classification, i.e., determination of new entity assignments, have been performed. The calculations are performed for each entity in the hierarchical structure 105. An entity may be pinned, i.e., automatically or manually selected, to avoid a move. A manual command may move such an entity. Further, at a process block 405, the process 400 converts contribution periods into allocation intervals. If an entity assignment is inside an imported branch, that entity assignment is also affected by nested ratios. In addition, at a process block 406, the process 400 moves any remaining allocations that do not add up to one hundred percent to the root consolidation.

The rule based hierarchical configuration 100 illustrated in FIG. 1 may be utilized to automate grouping of a heterogeneous set of investments, e.g., mutual funds, hedge funds, private equity funds, etc., into a plurality of consolidations, i.e., nested subsets, of homogeneous investments. As a result, the performance metrics may be aggregated for a multi-asset class portfolio, i.e., a heterogeneous set of investments.

Further, the rule based hierarchical configuration 100 avoids the error prone possibilities associated with manual inspection of investments having properties that vary across multiple dimensions. For example, the rule based hierarchical configuration 100 is able to automatically inspect and automatically categorize significant quantities of investments, e.g., hundreds of thousands of investments, across multiple dimensions. The user may construct and populate the rule based hierarchical configuration 100 with zero, one, or more matching rules at each consolidation. As a result, the rule based hierarchical configuration 100 is able to automatically generate consolidations that contain homogeneous sets of investments according to the definition of the user, may be treated as a unit with no internal constituents, may be automatically augmented with new members, may be automatically reduced to delete members, and may accommodate user overrides of consolidation contents while preserving the integrity of aggregations according to explainable accounting rules. Further, the rule based hierarchical configuration 100 is dynamic to allow automatic ongoing maintenance of consolidations during the evolution of an investment portfolio.

Figure 2:
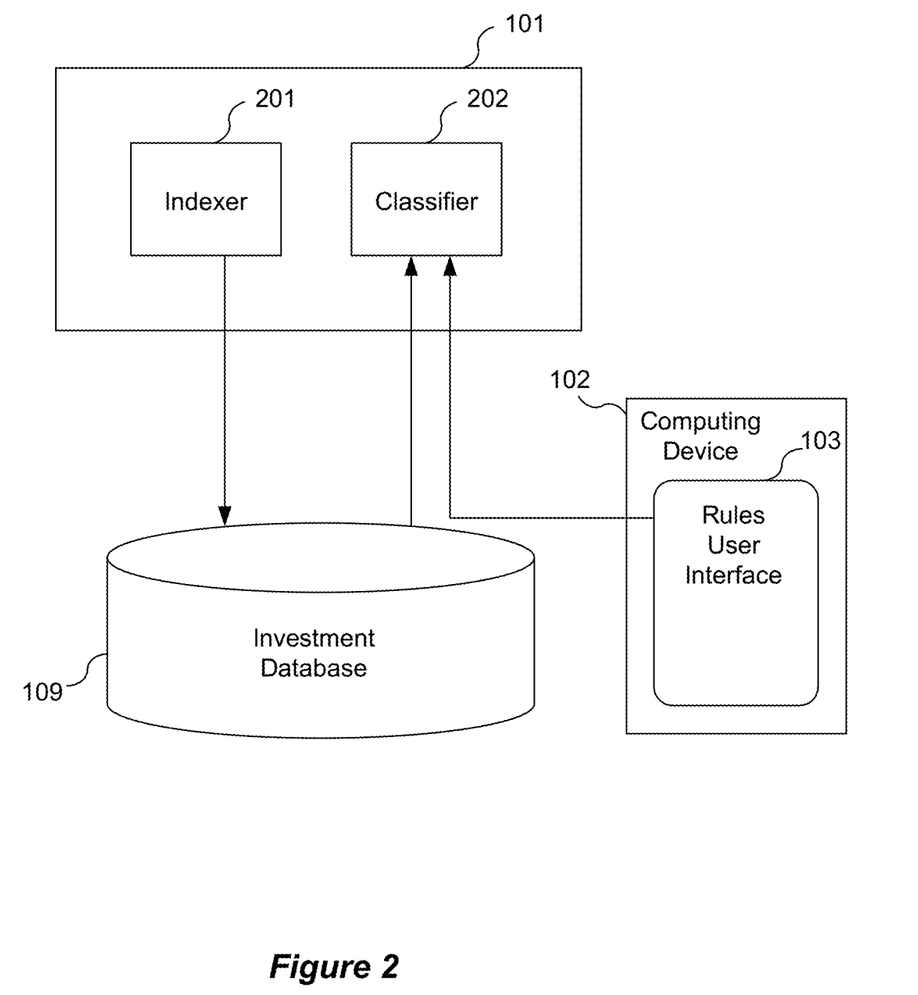
FIG. 2 illustrates a view of the internal components of the rules engine illustrated in FIG. 1.

FIG. 2 illustrates a view of the internal components of the rules engine 101 illustrated in FIG. 1. The rules engine 101 has an indexer 201 and a classifier 202. The rules engine 101 may implemented by a processor.

The indexer 201 indexes the various investment data for storage in the investment database 109. The classifier 202 determines new entity assignments based upon data that stored in the investment database 109 and rules that are received from the rules interface 103. A search engine may then search the investment database 109 based upon the indexing approach utilized by the indexer 201. For example, entities may be tagged via a tagging mechanism. As a result, entities may be efficiently searched based upon a variety of attributes. Further, certain aspect hierarchical structures may allow for a mass tagging mechanism to be utilized. A user may explicitly add entities to the hierarchical structure 105. Upon a save command being performed, those entities may get automatically tagged with certain attributes. An example of such a tag is asset class/strategy/sub-strategy. The entity may then be indexed or re-indexed in the investment database 109 for searches performed by a search engine.

Figure 3:
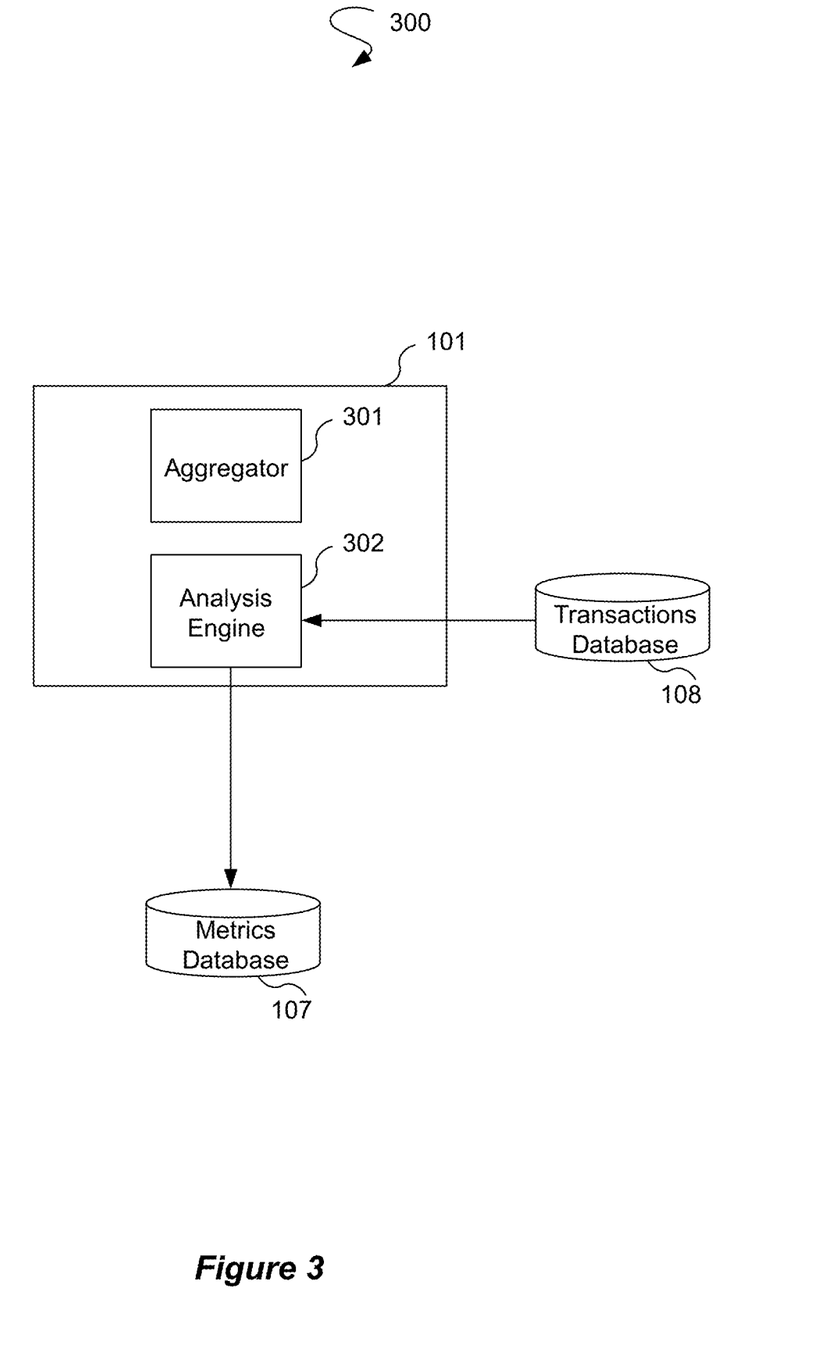
FIG. 3 illustrates a view of the internal components of the processing engine illustrated in FIG. 1.

FIG. 3 illustrates a view of the internal components of the processing engine 106 illustrated in FIG. 1. The processing engine 106 has an aggregator 301 and an analysis engine 302. The aggregator 301 performs a set of calculations for each entity and consolidation in the hierarchical structure 105. For example, the aggregator 301 may perform a set of calculations based upon certain criteria such as year to date, month to date, etc. The analysis engine 302 may then generate a pre-configured report based upon the computed data from the aggregator 301. As a result, the processing engine 106 automatically generates a customized report based upon the hierarchical structure 105 that a portfolio manager can provide to an entity. The processing engine 106 may implemented by a processor.

Figure 5:
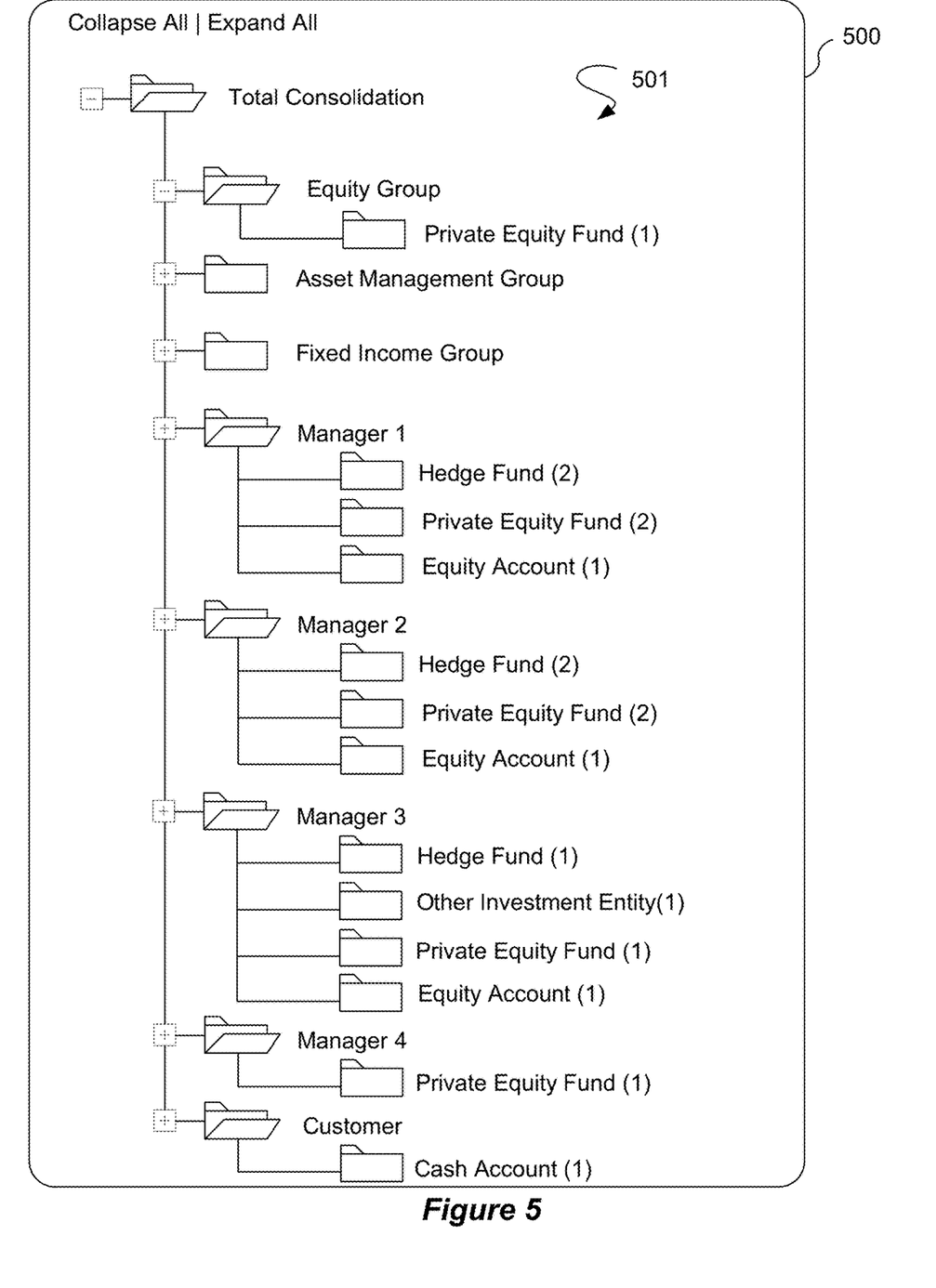
FIG. 5 illustrates a display screen that displays an example of a consolidation hierarchical structure.

FIG. 5 illustrates a display screen 500 that displays an example of a consolidation hierarchical structure 501. The hierarchical structure 501 has a total consolidation folder that includes various subfolders that may be expanded to the display the entirety or portions of the hierarchical structure 501 for the hierarchical structure 501.

Figure 6:
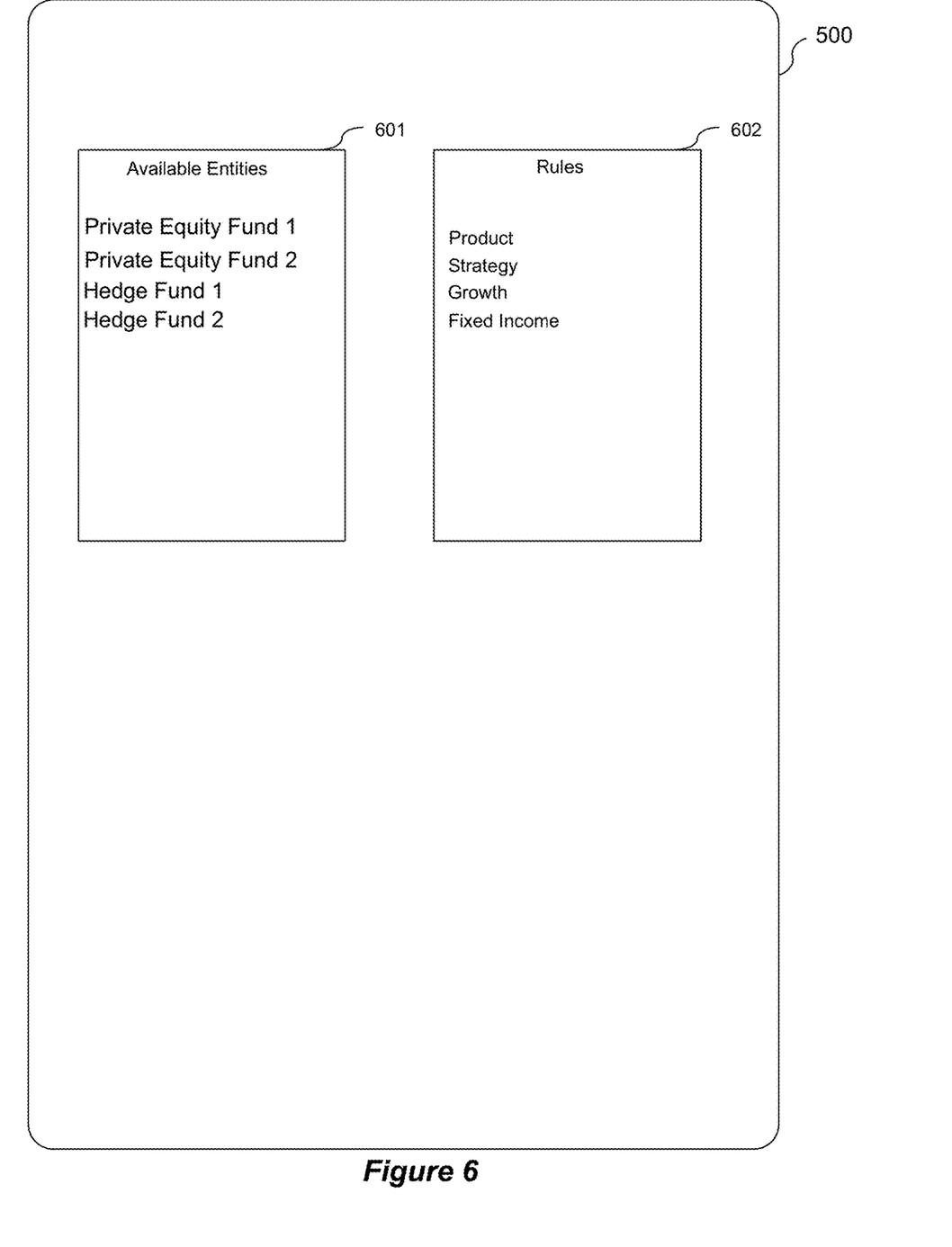
FIG. 6 illustrates the display screen of FIG. 5 that displays menus for determining the scope of the consolidation hierarchical structure.

FIG. 6 illustrates the display screen 500 of FIG. 5 that displays menus for determining the scope of the consolidation hierarchical structure 501. For example, a scope menu 601 of available entities may be determined by a rules menu 602. The rules menu 602 may include various selectable criteria for determining which rules are to be utilized for selecting entities from the consolidation hierarchical structure 501 and investments associated with such entities for reporting to an organization. For instance, a user or a computing device may select various criteria such as a product, strategy, growth entity, fixed income entity, etc. to filter entities from the consolidation hierarchical structure 501. Such criteria are provided only as examples as a variety of different criteria may be utilized. The rules engine 101 may then generate a consolidation hierarchical structure 501 based upon those rules. For example, the consolidation hierarchical structure 501 may result from the application of the rules to the various entities.

In various embodiments, a user may manually add consolidations in addition to the automatic determination of consolidations performed by the rules engine 101. For example, a user may manually add folders to the consolidation hierarchical structure 501 that was automatically generated by the rules engine 101. As a result, the user is able to generate a split assignment of an entity.

The rule based hierarchical configuration 100 also allows a subset or an entirety of a first hierarchical structure to be imported into a second hierarchical structure. Such importation includes the rules associated with the leaf or leaves that are being imported. As a result, the rules of a first hierarchical structure are blended into a second hierarchical structure such that a composite hierarchical structure is generated.

Figure 7A:
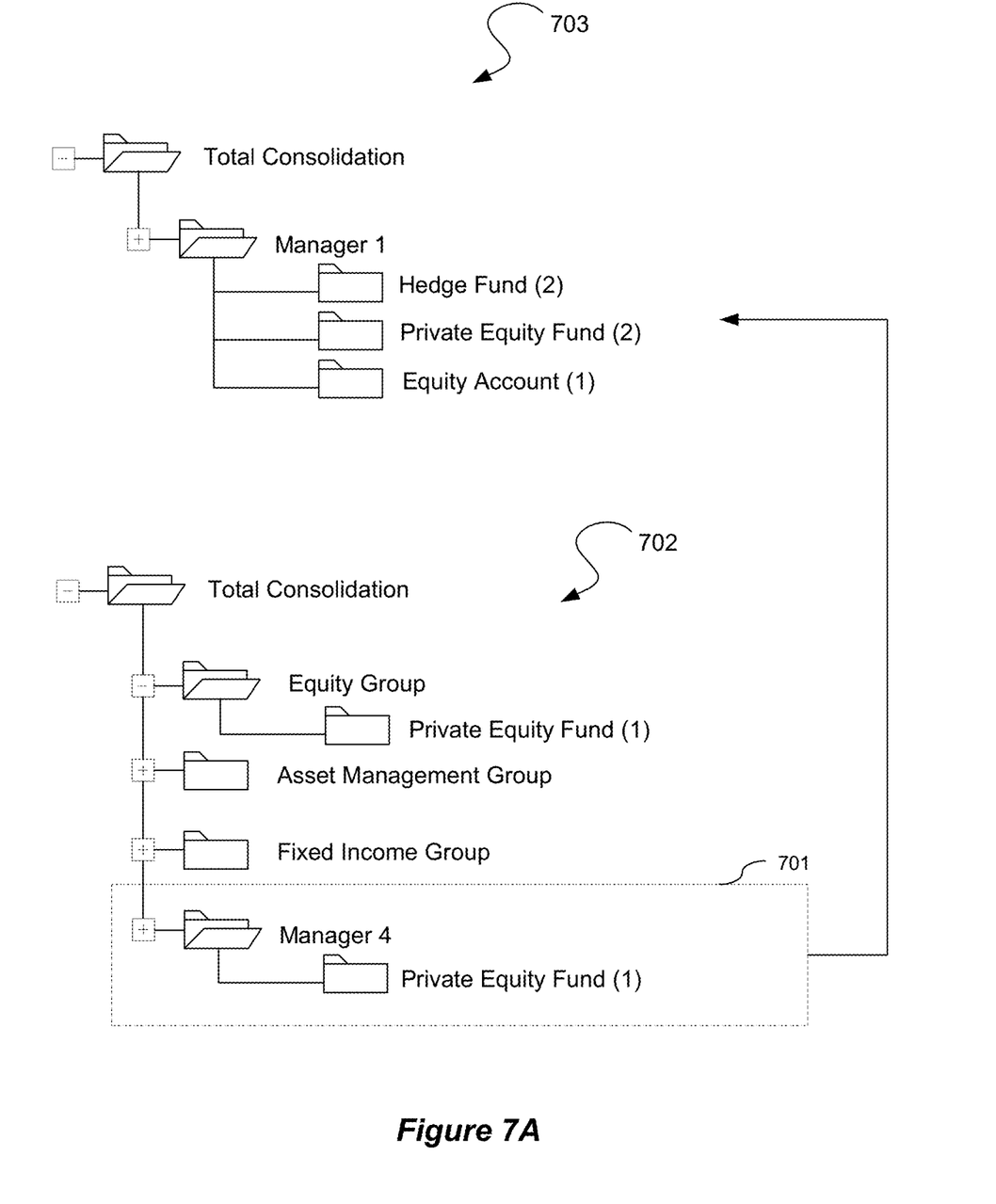
FIGS. 7A and 7B illustrate a composite hierarchical structure that is generated from importing a leaf of a first hierarchical structure into a second hierarchical structure.
Figure 7B:
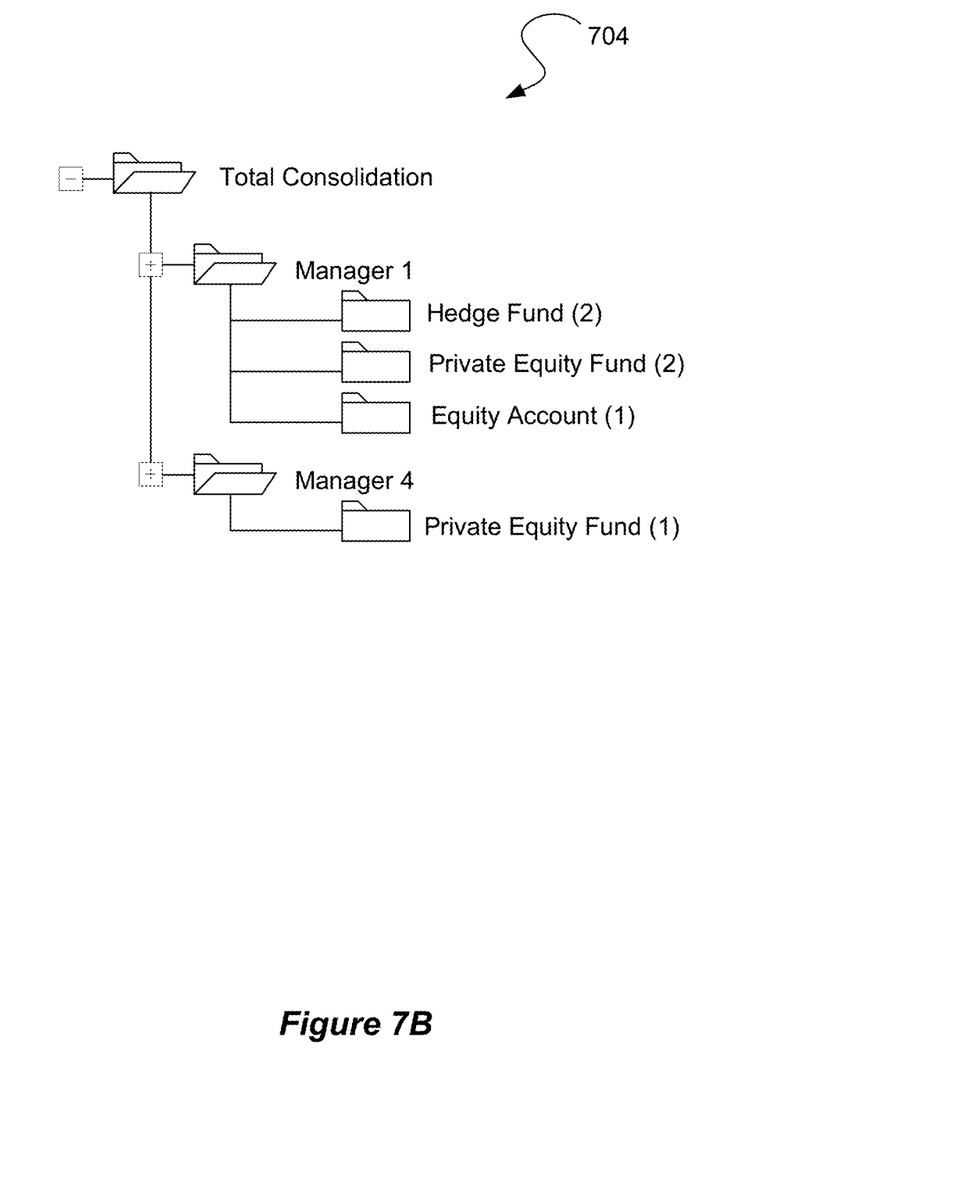

FIGS. 7A and 7B illustrate a composite hierarchical structure 704 that is generated from importing a leaf 701 of a first hierarchical structure 702 into a second hierarchical structure 703. The composite hierarchical structure 704 then follows the rules of the first hierarchical structure 702 and the imported rules from the leaf 701.

Figure 8:
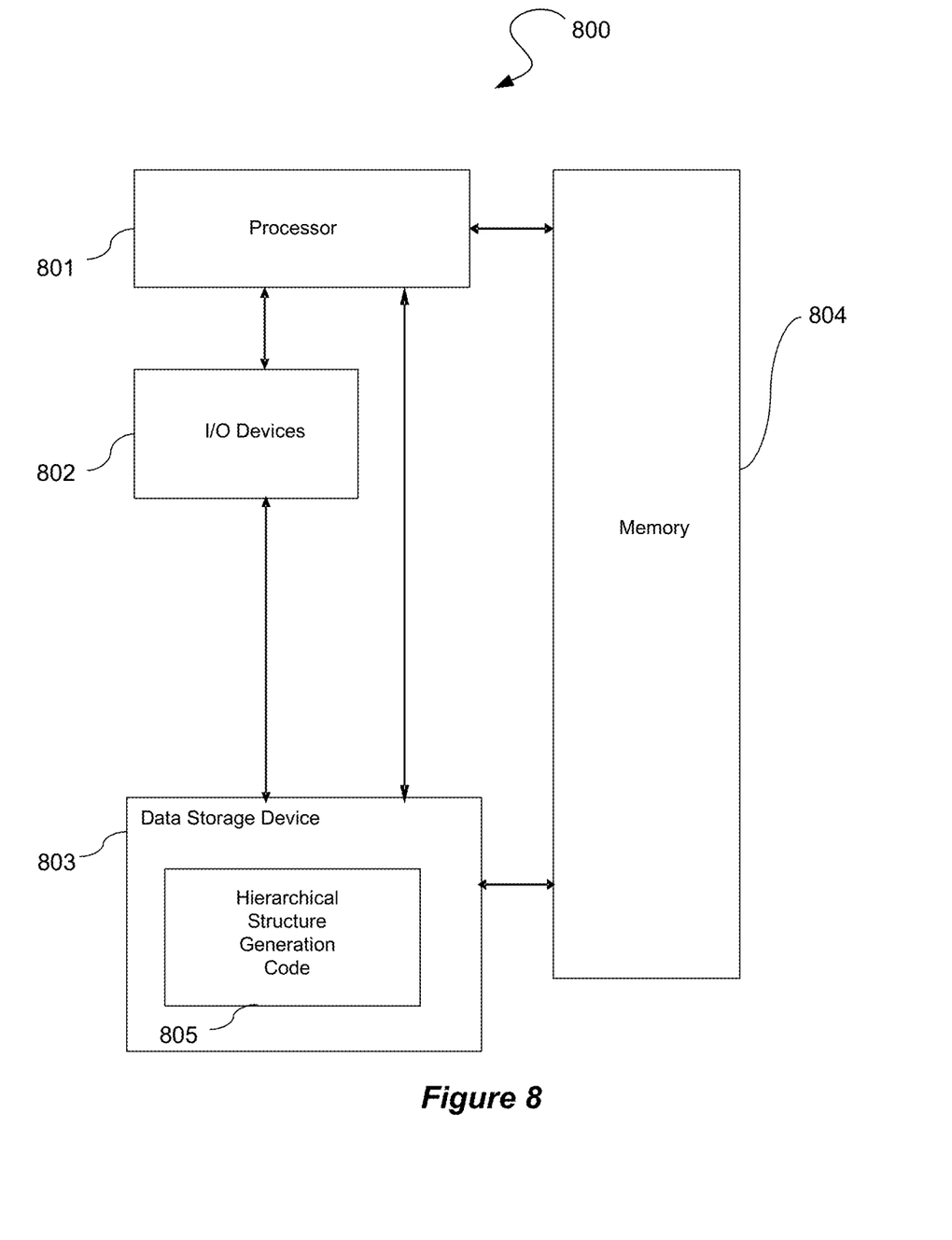
FIG. 8 illustrates a block diagram of a system that generates the hierarchical structure illustrated in FIG. 1.

FIG. 8 illustrates a block diagram of a system 800 that generates the hierarchical structure 105 illustrated in FIG. 1. In one embodiment, the station or system 800 is implemented utilizing a computer or any other hardware equivalents. Thus, the station or system 800 comprises a processor 801, a memory 804, e.g., random access memory ("RAM") and/or read only memory ("ROM"), hierarchical structure generation code 805, a data storage device 804 that stores the hierarchical structure generation code 805, and various input/output devices 802, e.g., audio/video outputs, audio/video inputs, a receiver, a transmitter, a speaker, a display, an image capturing sensor, a clock, an output port, a user input device, etc.

In various embodiments, the processor 801 may be a general multi-purpose processor. In other various embodiments, the processor 801 is a specialized processor that is specifically configured to generate a hierarchical structure 105 by utilizing the rules engine 101 and the processing engine 106 as illustrated in FIG. 1 based upon the hierarchical structure generation code 805 as illustrated in FIG. 8.

The processes described herein may be implemented by a general multi-purpose processor or a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code, intermediary language or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. The messaging protocol configurations described herein are device-independent as they may be utilized to send and receive messages for a variety of types of computing devices such as personal computers, laptops, tablet devices, smartphones, kiosks, set top boxes, etc.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A system comprising:
    a processor;
    an investment database that stores a tree-based hierarchical structure corresponding to a plurality of investments;
    a rules engine that automatically generates, with the processor, the tree-based hierarchical structure by translating a plurality of rules authored by a user into the tree-based hierarchical structure such that each of the plurality of rules corresponds to a nested data structure within the tree-based hierarchical structure and defines one or more behavior parameters of the nested data structure, automatically determines, with the processor, that an entity tag corresponding to a current entity in the tree-based hierarchical structure lacks a match with one or more root consolidation level rules in the plurality of rules upon addition of an additional entity and one or more additional entity rules to the tree-based hierarchical structure, automatically synchronizes, with the processor, a scope of the tree-based hierarchical structure based upon the addition of the additional entity to the tree-based hierarchical structure by removing the current entity from the tree-based hierarchical structure that lacks compliance with at least one of the plurality of rules based upon addition of one or more additional entity rules, corresponding to the additional entity, to the plurality of rules, automatically indexes via a searchable index, with the processor, the additional entity in the tree-based hierarchical structure according to an additional entity tag, the tree-based hierarchical structure providing non-fixed nesting depth and non-fixed breadth, each of the plurality of rules being inherited by one or more levels for a corresponding nested data structure in the tree-based hierarchical structure, the additional entity tag being selected from the group consisting of: investment asset, investment strategy, and investment sub-strategy; and
    a processing engine that automatically generates, with the processor, a report based on the tree-based hierarchical structure, the processing engine being synchronized to dynamically update, with the processor, the report based on the addition of the additional entity.

2. The system of claim 1, wherein the rules engine imports at least a portion of an additional tree-based hierarchical structure into the tree-based hierarchical structure and modifies the plurality of rules to include a plurality of additional rules from the at least said portion of the additional tree-based hierarchical structure.

3. A computer program product comprising a non-transitory computer useable storage device having a computer readable program, wherein the computer readable program when executed on a computer causes the computer to:
    store, at an investment database, a tree-based hierarchical structure corresponding to a plurality of investments;
    automatically generate, with a rules engine via a processor, the tree-based hierarchical structure by translating a plurality of rules authored by a user into the tree-based hierarchical structure such that each of the plurality of rules corresponds to a nested data structure within the tree-based hierarchical structure and defines one or more behavior parameters of the nested data structure, the tree-based hierarchical structure providing non-fixed nesting depth and non-fixed breadth, each of the plurality of rules being inherited by one or more levels for a corresponding nested data structure in the tree-based hierarchical structure;
    automatically determine, with the rules engine via the processor, that an entity tag corresponding to a current entity in the tree-based hierarchical structure lacks a match with one or more root consolidation level rules in the plurality of rules upon addition of an additional entity and one or more additional entity rules to the tree-based hierarchical structure;
    automatically synchronize, with the rules engine via the processor, a scope of the tree-based hierarchical structure based upon the addition of the additional entity to the tree-based hierarchical structure by removing the current entity from the tree-based hierarchical structure that lacks compliance with at least one of the plurality of rules based upon addition of one or more additional entity rules, corresponding to the additional entity, to the plurality of rules;

automatically index via a searchable index, with the processor, the additional entity in the tree-based hierarchical structure according to an additional entity tag, the additional entity tag being selected from the group consisting of: investment asset, investment strategy, and investment sub-strategy;

automatically generate, with a processing engine via the processor, a report based on the tree-based hierarchical structure; and dynamically update, with the processing engine via the processor, the report based on the addition of the additional entity.

4. The computer program product of claim 3, wherein the computer is further caused to import at least a portion of an additional tree-based hierarchical structure into the tree-based hierarchical structure and modify the plurality of rules to include a plurality of additional rules from the at least said portion of the additional tree-based hierarchical structure.

5. A method comprising:

store, at an investment database, a tree-based hierarchical structure corresponding to a plurality of investments;

automatically generating, with a rules engine via a processor, a tree-based hierarchical structure by translating a plurality of rules authored by a user into the tree-based hierarchical structure such that each of the plurality of rules corresponds to a nested data structure within the tree-based hierarchical structure and defines one or more behavior parameters of the nested data structure, the tree-based hierarchical structure providing non-fixed nesting, non-fixed breadth, and non-fixed depth, each of the plurality of rules being inherited by one or more levels for a corresponding nested data structure in the tree-based hierarchical structure;

automatically determining, with the rules engine via the processor, that an entity tag corresponding to a current entity in the tree-based hierarchical structure lacks a match with one or more root consolidation level rules in the plurality of rules upon addition of an additional entity and one or more additional entity rules to the tree-based hierarchical structure;

automatically synchronizing, with the rules engine via the processor, a scope of the tree-based hierarchical structure based upon the addition of the additional entity to the tree-based hierarchical structure by removing the current entity from the tree-based hierarchical structure;

automatically index via a searchable index, with the processor, the additional entity in the tree-based hierarchical structure according to an additional entity tag, the additional entity tag being selected from the group consisting of: investment asset, investment strategy, and investment sub-strategy;

automatically generating, with a processing engine via the processor, a report based on the tree-based hierarchical structure; and dynamically updating, with the processing engine via the processor, the report based on the addition of the additional entity.

6. The method of claim 5, further comprising importing at least a portion of an additional tree-based hierarchical structure into the tree-based hierarchical structure and modify the plurality of rules to include a plurality of additional rules from the at least said portion of the additional tree-based hierarchical structure.

* * * * *